ELECTROETCH PROCESS FOR SEMICONDUCTORS

Filed Dec. 22, 1961

ROBERT W. TEICHNER
*INVENTOR.*

BY

Flehr and Swain
ATTORNEYS

United States Patent Office 3,161,576

Patented Dec. 15, 1964

3,161,576

ELECTROETCH PROCESS FOR SEMICONDUCTORS

Robert W. Teichner, Palo Alto, Calif., assignor to Clevite Corporation, a corporation of Ohio Filed Dec. 22, 1961, Ser. No. 161,573
4 Claims. (Cl. 204—143)

This invention relates generally to an electroetch process for semiconductors and more particularly to an electroetch process for forming depressions or wells of predetermined depth and configuration in wafers, slices or blocks of semiconductor material such as silicon.

In the fabrication of many semiconductor devices, it is necessary that the starting wafers employed have exact thicknesses and smooth surfaces. In general, wafers are formed by cutting from larger ingots slices of material and then operating on the same as, for example, by cutting, lapping and chemically etching to form the smooth surface.

Recently, an electropolish process has been suggested. By this process, the surfaces of the wafers can be given a substantially better polish than with the methods described above. Thus, after the mechanical operations or after the chemical etching operation, the wafer may be subjected to an electropolishing operation. The electropolishing process consists of making the wafer the anode of an electrolytic system and passing a current through the wafer as its surface is lapped by a relatively soft absorbing material, such as parchment paper, which has continuously applied thereto an electrolyte. The wafer is oxidized and the products are washed away by the electrolyte.

When it is desired to obtain depressions or the like in wafers, they are formed by masking the surface of the wafer and then chemically etching to eat away the material and form the depressions. However, etching solutions which chemically remove material do not leave depressions having flat, polished bottom surfaces. Depressions have also been formed in the prior art by mechanically removing material and subsequently polishing the depression as, for example, by chemical etching.

It is an object of the present invention to provide an improved method for forming depressions or the like in semiconductor material.

It is another object of the present invention to provide a method for forming depressions in semiconductor material by masking and electroetching.

It is a further object of the present invention to provide a method for forming depressions in a wafer of semiconductive material, which depressions have relatively flat, polished bottom surfaces.

These and other objects of the invention will become more clearly apparent from the following description when taken in conjunction with the accompanying drawing.

Referring to the drawing:

FIGURE 1 schematically shows apparatus for carrying out the invention;

Figures 1, 2, 3, 4, 5:
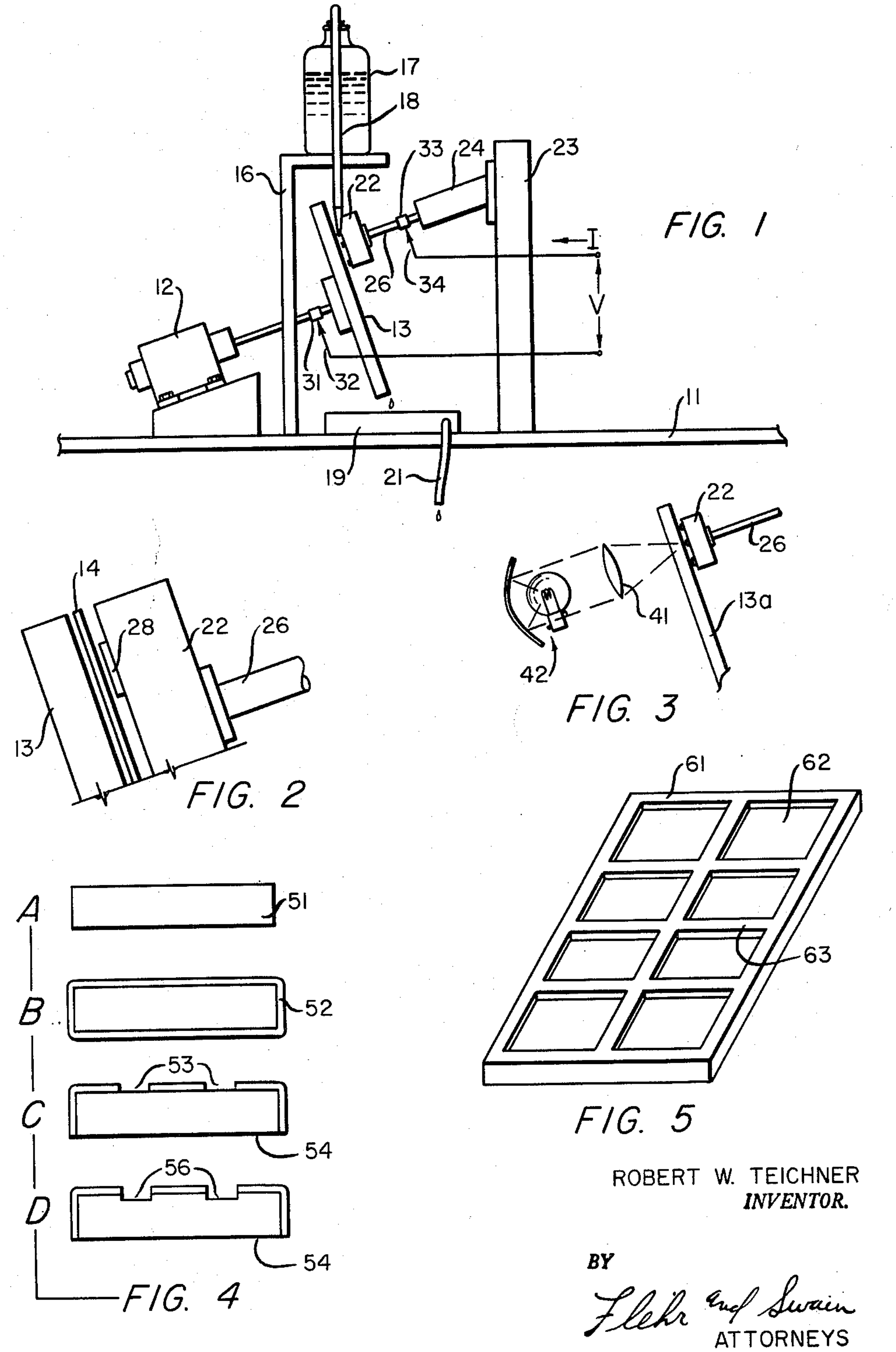
FIGURE 2 is an enlarged view of a portion of the apparatus shown in FIGURE 1.
FIGURE 3 is an elevational view of a portion of the apparatus which is modified to illuminate the wafer.
FIGURE 4 shows the steps in forming depressions in a wafer of semiconductive material.
FIGURE 5 shows a wafer of semiconductive material treated in accordance with the invention to form a waffle-like structure.

Referring to FIGURES 1 and 2, there is schematically shown an apparatus of the type employed for carrying out electropolishing operations in accordance with the prior art. The apparatus illustrated in FIGURE 1 includes a supporting base 11. A drive motor 12 is mounted on the base and serves to drive a lapping wheel or disc 13. Speed reducing means may be associated with the motor whereby the lapping wheel is driven at a suitably slow speed. It has been found, for example, that a speed of 72 r.p.m. is satisfactory.

Disposed on the surface of the lapping wheel 13 is a disc 14 which can be any type of material which has heavy wet strength and an open fibre structure. For example, hemp-type materials and parchment paper have been found satisfactory.

There is placed on a bracket 16 a buffer solution reservoir 17 which serves to feed a buffer onto the wettable disc 14 by a siphoning action through a tubing 18. The buffer maintains the disc in wet condition. The buffer continuously flows off of the wheel into a collecting trough 19 and thence through a tubing 21 to a drain.

A smaller wheel 22 is rotatably mounted from a bracket 23. The wheel 22 is received within a member 24 which may include internal spring means for urging the shaft 26 towards the lapping wheel whereby the wheel 22 is urged against the disc 14 with a predetermined small pressure. Wafers 28, FIGURE 2, to be electropolished are suitably mounted on the face of the wheel 22 and urged into physical contact with the surface of the wetted disc. Commutating means are provided for applying voltage between the wheels 13 and 22 to cause a flow of current through the wafer. The commutating means are schematically illustrated as a commutator ring 31 and brush 32, and commutator ring 33 and brush 34. The voltage V then causes current I to flow. A satisfactory current density has been in the neighborhood of .1 and .2 amp per centimeter squared. Rotation of the wheel 13 will urge, by frictional engagement, different portions of the wheel 22 to rotate at different velocities. The wheel 22 will, therefore, rotate.

When a silicon wafer is polished, the wafer is made the anode or positive terminal, while the lapping wheel 13 is made the negative terminal or cathode. The current will oxidize the silicon. The buffer forms the electrolyte. It also provides good conductive contact between the wheel 13 and disc 14 and the surface of the wafer, and continuously washes away the products formed by the oxidization to maintain the surface clean to continuously expose new surface. The process serves to rapidly oxidize and remove surface material.

When polishing p-type material, the foregoing process is satisfactory. However, when polishing n-type material, it has been found that to generate sufficient carriers to provide the current density required for the oxidization of the silicon, it is necessary to generate carriers by a photoprocess. In such instance, the lapping wheel illustrated as 13*a* in FIGURE 3 is perforated. Disposed adjacent thereto is a lens system schematically illustrated at 41 which focuses light from the light source 42 onto the surface of the wafer to be lapped to thereby generate carriers.

Generally, the buffer solution employed is relatively weak whereby the chemical etching itself is negligible; all of the electropolishing takes place due to the electric current flowing through the same. A suitable buffer solution has been found to be a solution containing 33% by volume glycerin, 66% by volume deionized water and 1% by volume of ammonium bifluoride.

In accordance with the present invention, the foregoing process is used to form depressions in a wafer of semiconductive material.

Referring to FIGURE 4A, there is shown a wafer of semiconductor material 51, into which depressions or wells are to be formed. The first step in the process is to subject the wafer to an oxidizing atmosphere at an elevated temperature to form an oxide surface coating 52, FIGURE 4B. For example, the wafer may be subjected to an atmosphere containing water vapor at a temperature of about 1200° C. for one to two hours. Subsequently, by photoresist techniques, the wafer is masked with an acid resist coating and the oxide is removed over predetermined areas to expose the underlying wafer. This is schematically illustrated by windows 53, FIGURE 4C. It has been suggested to form the mask with photoresist or wax. However, such a mask would wear away during the electroetch operation.

The wafer is then mounted with the lower surface 54 in conductive contact with the member 22. The electroetch process described above is then carried out. The oxide serves to electrically insulate the underlying regions of the wafer whereby current will only flow through the device at the windows or openings 53, the conductive connection being made by the buffer solution. The semiconductive material is removed to form a plurality of depressions as schematically illustrated at 56, FIGURE 4D. The oxide is relative hard and bonded to the underlying silicon wafer so that it is not worn away during the process. The foregoing process rapidly forms depressions having relatively flat, polished bottoms.

The foregoing process can be advantageously applied to form a waffle structure of the type shown in FIGURE 5 wherein a wafer 61 of semiconductive material is provided with a suitable oxide mask formed by oxidizing, masking and etching to expose the areas 62. Subsequently, the wafer is electroetched for a predetermined period of time to thereby form the plurality of thinner portions 62 shown in the wafer. In this manner, it is possible to form relatively thin web 62 which could not otherwise be handled and to support the same by ribs 63 of the material. By employing a suitable mask on each side, which are in registry, and performing electroetch operations on each side, there is provided a structure with even thinner webs.

The following are typical examples of results obtained by the process when using the electrolyte described above.

| | Wafer Material | |
|---|---|---|
| | .001Ω/cm. p-type silicon | .5Ω/cm. n-type silicon |
| Oxidizing Time | 2 | 2 |
| Oxidizing Temperature ° C. | 1,200 | 1,200 |
| Applied Voltage volts | 10 | 10 |
| Starting Thickness microns | 500 | 73–80 |
| Etching Time min | 57 | 32 |
| Etching Current ma./cm.² | 303 | 75 |
| Depth of Depression microns | 120 | 41.3 |

I claim:

1. In a process of selectively removing semiconductor material from a surface of a body of semiconductor material the steps of forming an insulating oxide layer of said semiconductor material on said surface with a window therein exposing the portion of the body from which it is desired to remove material, placing said surface in conductive contact via said window with a moving wettable member wetted wth a buffer, and passing current through the body of semiconductor material during movement of said member whereby the exposed portion of said surface is oxidized and the oxidized material is drained away by the buffer.

2. The process of selectively removing silicon from the surface of a body of silicon semiconductive material which comprises the steps first of subjecting the wafer to an oxidizing atmosphere at an elevated temperature to form an oxide of said silicon on at least one surface of the body, then selectively removing the oxide from said surface with an acid etch to expose predetermined areas of the underlying semiconductive material, followed by placing said exposed areas in conductive and physical contact with a moving wettable member, while wetting said member with a buffer and passing current through the material during movement of said member whereby the exposed material is oxidized and removed by the buffer under action of said member whereby a smooth, polished bottom surface is provided upon said areas.

3. The process of selectively removing semiconductor material from a surface of a body of semiconductor material which comprises the steps of applying to said surface an integral protective layer of an oxide of said semiconductor material, applying an acid resist mask to the oxide layer to expose a portion of said layer through said mask, etching the exposed portion of the oxide layer away to expose an area of the semiconductive material, placing said exposed area in conductive and physical contact with a moving wettable member while wetting said member with an electrolyte and passing current through the semiconductive material during movement of said member whereby a depression having a smooth, polished bottom surface is formed in said body.

4. The process of selectively removing silicon from the surface of a body of silicon semiconductive material which comprises the steps of first subjecting the wafer to an oxidizing atmosphere at an elevated temperature to form a silicon oxide coating on at least one surface of the body, selectively removing the oxide from said surface with an acid etch to expose predetermined areas of the underlying semiconductive material, placing said exposed areas in conductive and physical contact with a moving member of soft and absorbent material, wetting said member by continuously dripping buffer onto the material while tilting said member at a sufficient angle to the horizontal to drain said buffer away from the material, and passing current through the material during movement of the member whereby the exposed material is oxidized and removed by the buffer under action of said member whereby to provide a smooth, polished bottom surface upon said areas.

References Cited in the file of this patent

UNITED STATES PATENTS 2,965,556 Damgaard ............ Dec. 20, 1960

OTHER REFERENCES

Uhlir: Bell System Technical Journal, volume 35, March 1956, pages 333–347.